United States Patent
Averin et al.

(10) Patent No.: US 12,468,047 B2
(45) Date of Patent: Nov. 11, 2025

(54) METHOD AND APPARATUS FOR GNSS-BASED MOTION DETECTION

(71) Applicant: Topcon Positioning Systems, Inc., Livermore, CA (US)

(72) Inventors: Sergey Vladislavovich Averin, Moscow (RU); Andrey Valeryevich Plenkin, Moscow (RU); Andrey Andreevich Trofimov, Moscow (RU); Vyacheslav Viktorovich Lanovets, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 17/909,058

(22) PCT Filed: Mar. 3, 2022

(86) PCT No.: PCT/RU2022/000062
§ 371 (c)(1),
(2) Date: Sep. 2, 2022

(87) PCT Pub. No.: WO2023/167605
PCT Pub. Date: Sep. 7, 2023

(65) Prior Publication Data
US 2024/0248215 A1  Jul. 25, 2024

(51) Int. Cl.
*G01S 19/43* (2010.01)
*G01S 19/16* (2010.01)

(52) U.S. Cl.
CPC .............. *G01S 19/43* (2013.01); *G01S 19/16* (2013.01)

(58) Field of Classification Search
CPC combination set(s) only.
See application file for complete search history.

(56) References Cited

U.S. PATENT DOCUMENTS

| 5,557,284 A | 9/1996 | Hartman |
| 2007/0042790 A1* | 2/2007 | Mohi ................. G01S 5/0027 455/456.5 |
| 2014/0274115 A1 | 9/2014 | Michalson et al. |
| 2016/0377726 A1* | 12/2016 | Schipper ............. G01S 19/215 342/357.59 |
| 2017/0372580 A1 | 12/2017 | Vivathana |

OTHER PUBLICATIONS

Search Report in PCT/RU2022/000062, dated Dec. 1, 2022.

\* cited by examiner

*Primary Examiner* — Vladimir Magloire
*Assistant Examiner* — Eric K Hodac
(74) *Attorney, Agent, or Firm* — Bardmesser Law Group (57) ABSTRACT

Method for detecting motion of an object using GNSS signals, including (i) measuring distances between a GNSS antenna and GNSS satellites with carrier phases at a first time; (ii) computing distances between known positions of antenna and satellites at first time; (iii) for each satellite, calculating first set of residuals=distances in (i)–distances in (ii); (iv) measuring distances between antenna and satellites with carrier phases at a second time; (v) computing distances between known positions of antenna and satellites at second time; (vi) for each satellite, calculating second set of residuals=distances in (iv)–distances in (v); (vii) differencing first and second sets of residuals; (viii) computing a metric based on set of differences in (vii); (ix) comparing metric to a threshold; (x) based on comparison in (ix), determining if object moved or possibly moved between first time and second time.

12 Claims, 10 Drawing Sheets

METHOD AND APPARATUS FOR GNSS-BASED MOTION DETECTION

BACKGROUND OF THE INVENTION

Field of the Invention

The present invention relates generally to global navigation satellite systems (GNSS), and more particularly, to a method and apparatus for detecting motion of a physical objects, such as base stations, equipped with GNSS receiver.

Background of the Related Art

The equipment that receives signals of global navigation satellite systems (GNSSs) can determine target parameters, such as position, velocity, time (PVT). Examples of currently deployed global navigation satellite systems include Global Positioning System (GPS) of the United States of America and the GLONASS of Russian Federation. Other global navigation satellite systems, such as the European GALILEO and the Chinese Beidou, are under development. In a GNSS, a navigation receiver receives and processes radio signals transmitted by satellites located within a line-of-sight of the receiver. The satellite signals comprise carrier signals modulated by pseudo-random binary codes. The receiver measures the time delays of the received signals relative to a local reference clock, or oscillator. Code phase measurements enable the receiver to determine the pseudo-ranges between the receiver and the satellites. The pseudo-ranges differ from the actual ranges (distances) between the receiver and the satellites due to an offset, caused by the shift between the time scales of the GNSS and the receiver.

Measured pseudo-ranges along with other parameters measured by receiver are referred to as raw measurement data. If signals are received from a sufficiently large number of satellites, then the measured pseudo-ranges can be processed to determine the coordinates and the offset caused by the shift between the time scales of the GNSS and the receiver. This operational mode is referred to as a stand-alone mode, since the measurements are determined by a single receiver. A stand-alone system typically provides a position accuracy of about a meter.

To improve the position accuracy, differential navigation (DN) systems have been developed. In a DN system, the position of a user is determined relative to a base station, also referred to as a base. The base is typically fixed, and the coordinates of the base are precisely known, for example, by surveying. The base contains a navigation receiver that receives satellite signals and that can compute the corrections to GNSS measurements based on the known base position. In some DN systems, the raw measurement data of the base can serve as corrections.

The user, whose position is to be determined, can be stationary or mobile. In a DN system, the user is often referred to as a rover. The rover also contains a navigation receiver that receives GNSS satellite signals. Corrections generated at the base are transmitted to the rover via a communications link. To accommodate a mobile rover, the communications link is often a wireless link. The rover processes the corrections received from the base, along with measurements taken with its own receiver, to improve the accuracy of determining its position.

Accuracy is improved in the differential navigation mode because errors incurred by the receiver at the rover and by the receiver at the base are highly correlated. Since the coordinates of the base are accurately known, measurements from the base can be used for calculating corrections, thus compensating for the errors at the rover. If a DN system generates corrections to pseudo-ranges measured with code phase only, such a DN system is capable to provide a position accuracy on the order of tens of centimeters.

The position accuracy achieved with data generated by a DN system can be further improved, if a DN system, in addition to corrections based on pseudo-ranges measured with code phase, generates corrections based on pseudo-ranges measured with carrier phase. Carrier phase measurements along with code phase measurements are a part of raw measurement data, generated by the receiver. Improvement in positioning accuracy is achieved because pseudo-ranges measured with carrier phase have ~100 times smaller noise and multipath measurement errors, compared with pseudo-ranges measured with code phase. A differential navigation system that computes positions based on real-time carrier phase pseudo-range measurements, in addition to the code phase pseudo-range measurements, is often referred to as a real-time kinematic (RTK) system.

As a result of a DN system operation, the position of a rover is determined with an improved accuracy, but this accuracy is relative, and depends on accuracy of the base position. So, any offset of the known base position from the truth will translate into the same offset of a rover position. In other words, components of the "base-to-rover" vector can be determined accurately in a given reference frame, and then, these components should be applied to base position (not necessarily accurate) in order to compute position of the rover.

RTK systems might be used for highly accurate measurements of coordinates of static points. This mode of RTK operation is often referred to as topographic or geodetic survey. When in the geodetic survey mode an antenna of a rover receiver is positioned on a static point for some time, and several RTK solutions are computed. These RTK solutions should be averaged or filtered to provide the most precise evaluation of coordinates of a point to be surveyed.

Alternatively, RTK systems might be used for highly accurate trajectory measurements of mobile platforms, like construction, or agricultural machinery. In such applications, computed coordinates of the machine are fed into machine control system, where they are used for controlling the machine movement or machine service functions.

In cases when a DN system is used to survey a static point or control a machine within a given static reference frame, it is important to ensure that the base is totally immovable. Many factors might impact the base causing its shift from the original position, or even failure to the ground. If this is a rural area, the reason might be animals, if this is a construction site, the reason might be a machine, or worker passing close by. In some extreme cases, it even might be a human culprit, trying to steal the device.

When a base has been left unattended and accidentally moved, but maintains the output of corrections, this might undermine the accuracy of a survey or of a machine control, causing unpredictable consequences. As such, it is important to stay aware of any uncontrollable base movements. Thus, it is desirable that even tiny base movements are detected automatically, and warnings are sent to a customer/rover.

The embodiment of method and apparatus described herein might be used to detect spontaneous base movements and inform customers of such events, in order to timely stop correction broadcasting and force customer to visit a base to inspect it.

Another embodiment might be used to monitor critical structures like bridges and dams and issue warnings when motion is detected, which might mean the danger of demolition or collapse.

In a third embodiment it might be used to monitor seismic activity in seismically critical areas and issue warning in case of earthquakes.

For motion detection and control, the typical conventional approach is using a combination of the mechanical devices and GNSS receivers. In Talbot et al., U.S. Pat. No. 5,862,501, entitled "Guidance Control System for Movable Machinery" a system is described comprising GNSS receiver, tilt sensor, compass and angular sensor.

In Weisenburger et al., US patent no. U.S. Pat. No. 9,488,736B2, entitled "Locally Measured Movement Smoothing of GNSS Position Fixes," a concept is presented where GNSS-derived positions are smoothed with data on position increments, measured by some local device, which can be an inertial measurement unit (IMU).

In Rudow et al., U.S. Pat. No. 9,821,999B2, entitled "External GNSS Receiver Module with Motion Sensor Suite for Contextual Inference of User Activity," a system is described intended for detecting the movements of a survey pole, comprising GNSS receiver and a motion sensor.

In Rudow et al., U.S. Pat. No. 9,880,286B2, entitled "Locally Measured Movement Smoothing of Position Fixes Based on Extracted Pseudoranges," a method is suggested for smoothing the position of GNSS receiver with a movement information taken from the cellular device.

In Ashjaee J., WO2019010427A3, entitled "GNSS Device Location Verification," a system is described in which a GNSS base position is verified, and alerts to users are issued when movement is detected with help of base velocity measurements of different kinds.

SUMMARY OF THE INVENTION

Accordingly, the present invention is directed to detecting movement of a GNSS antenna, connected to a GNSS receiver and sending a warning to the end user, if movement is detected.

The concept is based on the idea of measuring GNSS carrier phases and monitoring increments of carrier phase residuals, called residual's single differences, where "residual" means a difference between measured carrier phase and computed geometric range between static point and a satellite. The statistics of these residual's single differences is computed, analyzed, and a decision is made whether the GNSS antenna has been moved, or has been static, or this is hard to come to a definite conclusion.

If the motion has been detected, then a warning to the rover is issued. Additionally, if the receiver is configured as a GNSS base, correction output should be stopped, since its reliability is now questionable.

An additional feature, which is useful when motion has been detected, is output of the receiver position accompanied with position error evaluations. This feature is useful when the device has been stolen while being kept turned on. Such a feature might help tracking the location of the device, which had been carried away.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The attached drawings that further describe the present invention are incorporated in and constitute a part of specification, illustrate embodiments of the invention and together with the description serve to explain the principles of the invention.

In the Drawings.

DETAILED DESCRIPTION OF EMBODIMENTS OF THE INVENTION

Reference will now be made in detail to the preferred embodiments of the present invention, examples of which are illustrated in the accompanying drawings.

In contrast to techniques known in the prior art, the movement detection method described herein is based solely on use of GNSS measurements. No receiver velocity is computed, in contrast to the prior art. Also, no extra sensors or alternative measurement units are involved, simplifying the overall system.

The invention described herein is based on processing GNSS carrier phases and analysis of carrier phase residuals, where 'residual' means a difference between measured carrier phase and a computed geometric range (distance) between static point and a satellite.

The equipment that receives signals of global navigation satellite systems (GNSSs) can operate in various operational modes. Different operational modes require equipment of different complexities capable of determining target parameters (such as position, velocity, time and attitude) with different accuracies. The types and quantities of data to be processed also depend on the operational mode. Several operational modes are summarized below.

Figure 1A:
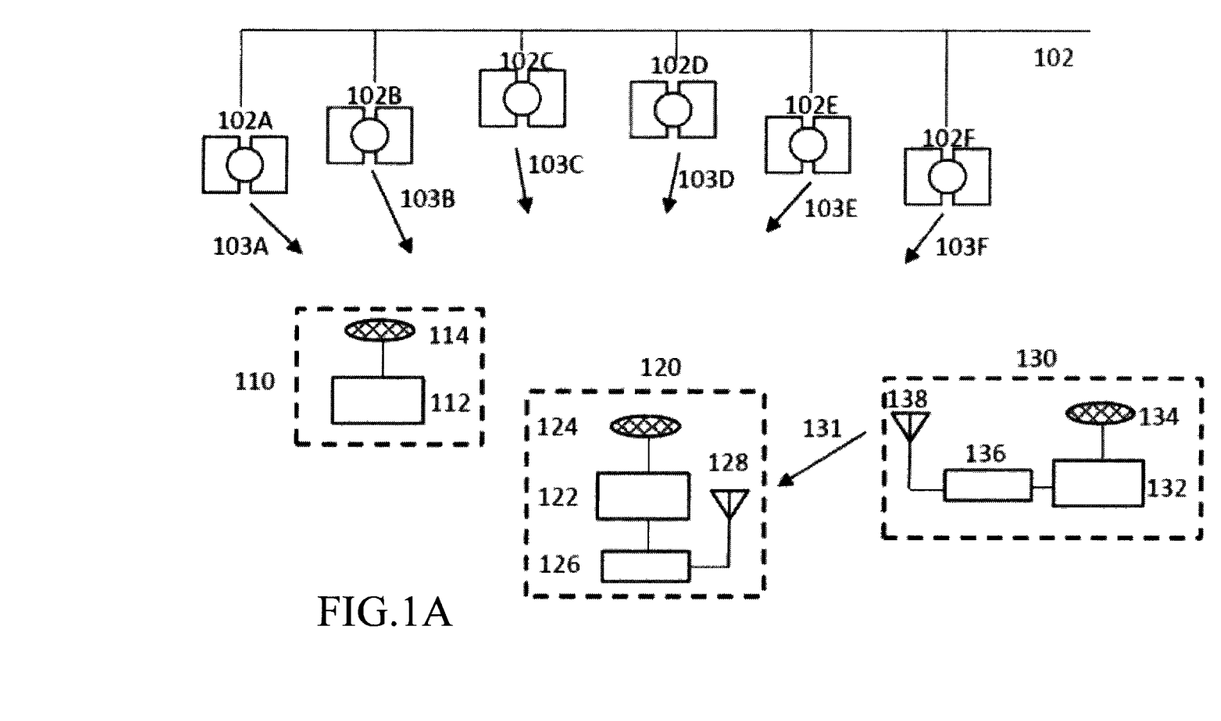
FIG. 1A shows an example of a global navigation satellite system in which the navigation receiver operates in a stand-alone mode or in a single-base-station differential navigation mode.

FIG. 1A shows a high-level schematic of a global navigation satellite system (GNSS). A constellation of global navigation satellites 102 transmits navigation signals. Shown are six representative navigation satellites, denoted 102A-102F, which transmit navigation signals 103A-103F, respectively. In general, the navigation satellites can belong to more than one global navigation satellite system (for example, GPS and GLONASS, or GPS, GLONASS and Galileo).

Referring now to the GNSS measurement unit 110, which operates in a stand-alone mode, the GNSS measurement unit 110 includes an antenna 114 and a navigation receiver 112. The antenna 114 receives navigation signals, such as navigation signals 103A-103F; from these navigation signals, the navigation receiver 112 can calculate target parameters, such as time, referenced to a GNSS system clock, and position and velocity referenced to the antenna 114. In some GNSS measurement units, the antenna is mounted in a fixed relationship with respect to the navigation receiver. If the GNSS measurement unit 110 is carried by a person who is walking or running, the GNSS measurement unit 110 can be used to calculate the position and velocity of the person as a function of time. If the GNSS measurement unit 110 is mounted on a moving vehicle, the GNSS measurement unit 110 can be used to calculate the position and velocity of the vehicle as a function of time.

In other GNSS measurement units, the antenna can be moved with respect to the navigation receiver. In one application, the antenna 114 is mounted on the blade of a bulldozer, and the navigation receiver 112 is mounted inside the cab of the bulldozer; the antenna 114 is coupled to the navigation receiver 112 via a flexible cable. The GNSS measurement unit 110 can then be used to measure the position and velocity of the blade as a function of time. To simplify the discussion below, phrases such as "position of the navigation receiver" or "position and velocity of the navigation receiver" are used; strictly, however, "position" and "velocity" refer to the parameters of the antenna that receives the navigation signals that are then processed by the navigation receiver.

The navigation signals comprise carrier phase signals modulated by pseudo-random binary codes. The navigation receiver measures the time delays of the received signals relative to a local reference clock, or oscillator. Code phase measurements enable the navigation receiver to determine the pseudo-ranges, which in essence are estimates of the distances between the navigation receiver and the navigation satellites. The pseudo-ranges differ from the actual ranges (distances) between the navigation receiver and the navigation satellites due to the offset between the time scales of the navigation receiver and the respective GNSS.

If navigation signals are received from a sufficiently large number of navigation satellites, then the measured pseudo-ranges can be processed to determine the position of the navigation receiver. In general, the three-dimensional coordinates of the navigation receiver can be determined; a reference Cartesian coordinate (x, y, z) system can be used. The reference Cartesian coordinate system can be an Earth Centered Earth Fixed (ECEF) system; WGS-84 is an example of an ECEF system. Two-dimensional coordinates along a reference horizontal plane (x-y plane) or a one-dimensional coordinate (Z or height) along an axis normal to the reference horizontal plane can also be determined. The reference horizontal plane can, for example, be tangent to the WGS-84 ellipsoid. A time referenced to a GNSS system clock can also be calculated by the navigation receiver from the navigation signals (which contain timing information). Velocity of the navigation receiver can be calculated by taking the time derivative of position as a function of time, by processing Doppler measurements, or by processing carrier phase measurements over a specific interval of time.

Various error sources contribute to the process of measuring pseudo-ranges, thus translating to errors in determination of the position, velocity and time. Examples of error sources include satellite clock errors, satellite ephemeris errors, variations in propagation velocities of the navigation signals due to the ionosphere and troposphere, reflections of GNSS signals from the objects near the antenna of the navigation receiver.

Some errors can be reduced by operating the GNSS in a differential navigation (DN) mode. Refer again to FIG. 1A. The GNSS measurement unit 130, also referred to as the base station (or base) 130, is fixed or stationary; its coordinates are precisely known (for example, from high-precision surveying measurements). The GNSS measurement unit 120, also referred to as the rover 120, in general is mobile.

The base station 130 includes the antenna 134 and the navigation receiver 132. The antenna 134 receives navigation signals 103A-103F. The base station 130 also includes the communications transceiver 136 and the antenna 138. Similarly, the rover 120 includes the antenna 124 and the navigation receiver 122. The antenna 124 receives the navigation signals 103A-103F. The rover 120 also includes the communications transceiver 126 and the antenna 128. The base station 130 transmits the communications signal 131 (for example, a radio frequency signal) from the antenna 138. The rover 120 receives the communications signal 131 at the antenna 128.

From the received navigation signals, the navigation receiver 132 at the base station 130 can calculate corrections to the received GNSS measurements with respect to the known position of the base station 130. In some DN systems, raw measurement data of the base station can serve as corrections. Corrections to the received GNSS measurements, along with some auxiliary information constitute the correction data. If the distance between the base station 130 and the rover 120 is relatively small, then many of the measurement errors at the base station 130 and at the rover 120 are correlated. The base station 130 transmits correction data to the rover 120 via the communications signal 131. The rover 120 processes the navigation signals and the correction data to determine the position of the rover 120. The accuracy with which the rover 120 can determine its position in the differential navigation mode is higher than the accuracy with which the GNSS measurement unit 110 can determine its position in the stand-alone mode.

A DN system that broadcasts correction data to code phase pseudo-range measurements is often referred to as a differential global positioning system (DGPS), or a differential global navigation satellite system (DGNSS). The position determination accuracy, achieved with help of a DN system can be further improved if correction data for code phase pseudo-ranges measurements is supplemented with the correction data for carrier phase pseudo-ranges measurements.

If the carrier phases of the signals transmitted by the same satellites are measured by both the navigation receiver in the base station and the navigation receiver in the rover, processing the two sets of carrier phase measurements can yield a position accuracy to within several percent of the carrier's wavelength. A DN system, which enables positioning based on real-time carrier phase pseudo-range measurements, in addition to the code phase pseudo-range measurements, is often referred to as a real-time kinematic (RTK) system. Processing carrier phase measurements to determine position of a rover includes the step of ambiguity resolution (AR); that is, determining the integer number of cycles in the carrier phase signals received by the navigation receivers from an individual satellite.

More complex DN systems, including RTK systems, are configured as network DN systems. In a network DN system, correction data for a rover is generated from measurements collected from a group of base stations that are geographically dispersed over a wide area. A network control center processes the measurements from the group of base stations and transmits the correction data to the rover via various communications links, such as radiofrequency satellite signals or General Packet Radio Service (GPRS). Network DN systems can differ by application areas, data processing methodology and target positioning accuracy.

Figure 1B:
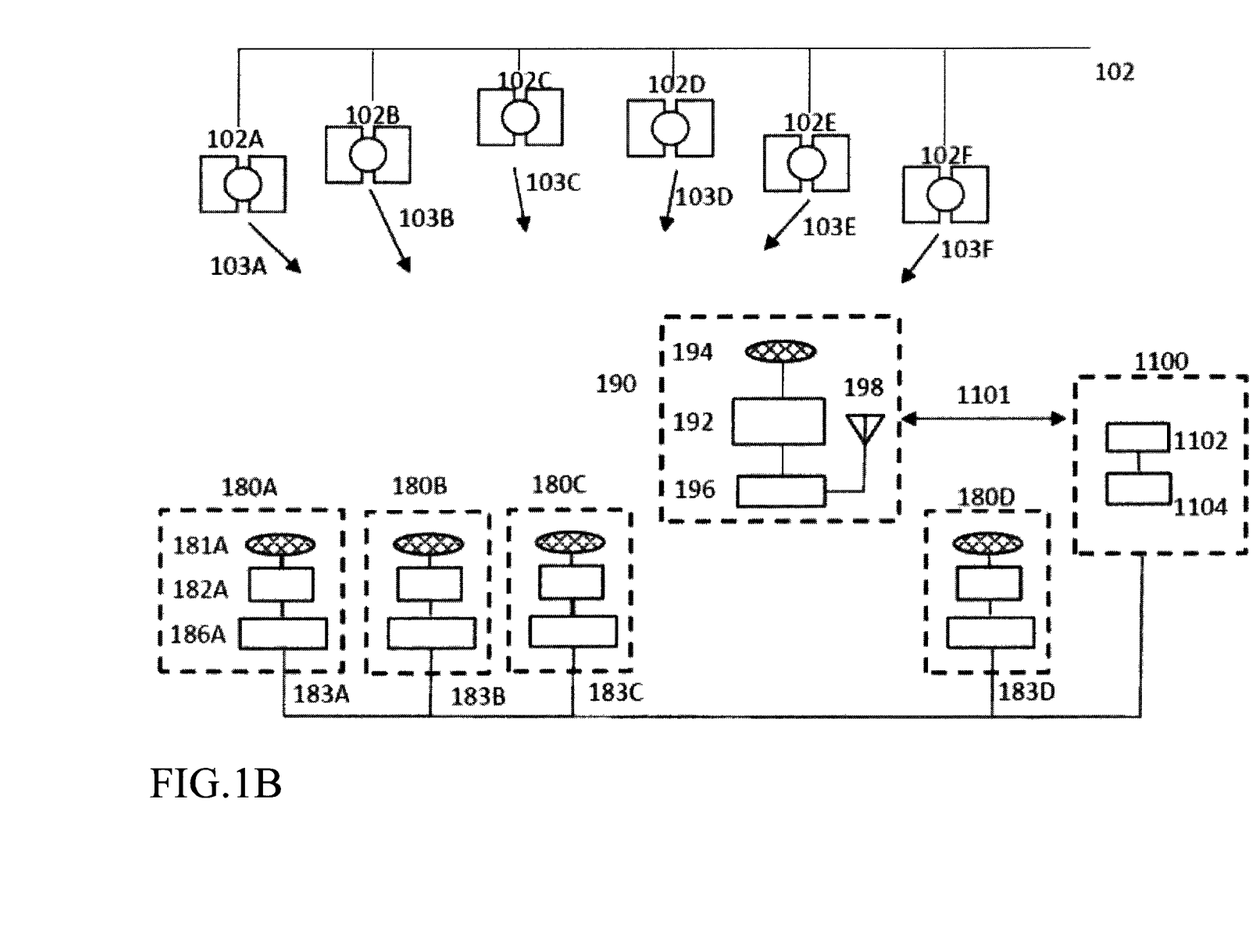
FIG. 1B shows an example of a global navigation satellite system in which the navigation receiver operates in a network differential navigation mode.

FIG. 1B shows an example of a regional (local) network DN system used to provide a network RTK solution; such systems are often referred to as Network RTK systems. Shown are the rover 190 and four representative base stations 180A-180D. The rover 190 includes the antenna 194 and the navigation receiver 192. The antenna 194 receives the navigation signals 103A-103F. The rover 190 also includes the communications transceiver 196 and the antenna 198. The base station 180A includes the navigation receiver 182A, the antenna 184A, and the data processing and communications unit 186A; base stations 180B-180D are each similar to the base station 180A.

In general, the rover and each base station can receive navigation signals from a slightly different subset of navigation satellites in the constellation 102 due to varying conditions in different locations. Operation of the rover in a network RTK mode is possible, however, only using satellite signals received simultaneously by the rover 190 and by the base stations 180A-180D.

Base stations 180A-180D transmit data 183A-183D, respectively, to the network control center (NCC) 1100. The data can be transmitted via communications links or via a communications network, e.g. Internet. The NCC 1100 includes the communications module 1102, and the data processing unit 1104. The NCC 1100 receives with help of communications module 1102 the data from the base stations, as well as the approximate position of the rover, and processes the data with help of data processing unit 1104, according to specific algorithms to generate a consolidated set of correction data corresponding to the rover position (described in more detail below).

The NCC 1100 makes the consolidated set of correction data available to the rover via a communications network, e.g. Internet, accessible via GPRS, for example. In FIG. 1B, the NCC 1100 receives the rover's approximate position and delivers the consolidated set of error correction data via the communications channel 1101 (for example, Internet, accessible via GPRS of cellular network). The rover 190 receives the correction data via the communication channel 1101 at the antenna 198. The rover 190 then calculates its position based on measurements collected with its receiver and the consolidated set of correction data.

The consolidated set of correction data in network RTK systems can be partitioned into several groups. The consolidated set of correction data can include:

Cumulative corrections to both code phase and carrier phase measurements from one or more individual base stations in a group of base stations;

Corrections to code phase and carrier phase measurements for some virtual (i.e., non-existent) base station generated from processing GNSS measurements collected with a group of base stations;

Corrections representing the dispersive part of GNSS measurement errors (measurement errors attributable to the ionosphere) for measurements from one or more individual base stations in a group of base stations;

Corrections representing the non-dispersive part of GNSS measurement errors (measurement errors attributable to the troposphere, satellite ephemeris, and satellite clock data) for measurements from one or more individual base stations in a group of base stations;

Coefficients approximating how various GNSS measurement error components change in space; and Auxiliary information, like evaluated hardware-induced biases, station ID, textual information on hardware or software of service provider, etc.

Figure 1C:
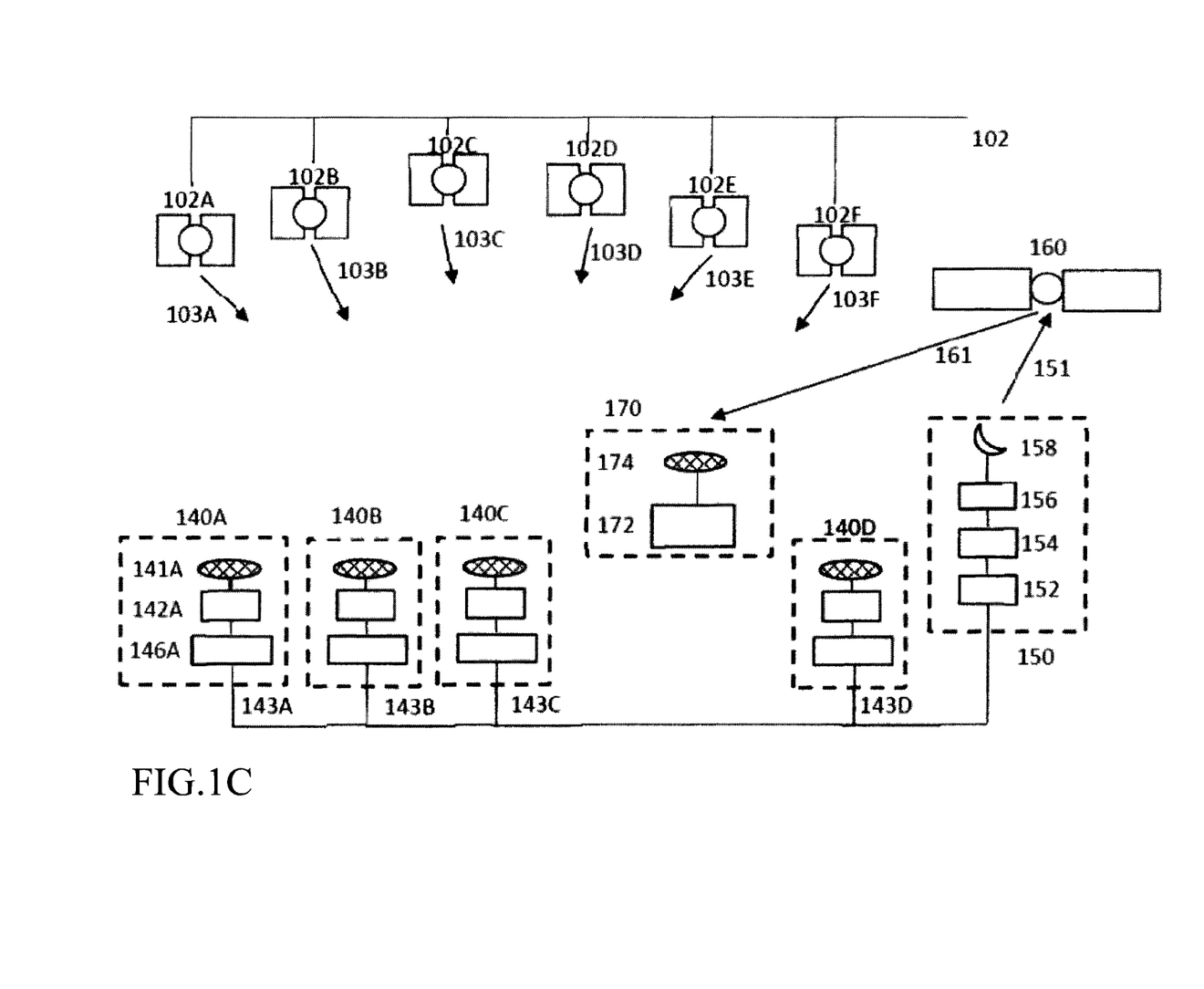
FIG. 1C shows an example of a global navigation satellite system in which the navigation receiver operates in a satellite-based network differential navigation mode.

FIG. 1C shows another example of a network DN system, referred to as a Space Based Augmentation System (SBAS). Shown are the rover 170 and four representative base stations 140A-140D. The rover 170 includes the antenna 174 and the navigation receiver 172. The base station 140A includes the navigation receiver 142A, the antenna 141A, and the data processing and communications unit 146A; base station 140B-base station 140D are each similar to the base station 140A. In general, the rover and each base station can receive navigation signals from a slightly different subset of navigation satellites in the constellation 102 due to varying conditions in different locations. Operation of the rover in a differential mode is possible, however, only using satellite signals received simultaneously by the rover 170 and by the base stations 140A-140D.

Base stations 140A-140D transmit data 143A-143D, respectively, to the network control center (NCC) 150. The data can be transmitted via communications links or via a communications network, e.g. Internet. The NCC 150 includes the communication module 152, data processing unit 154, satellite transmitter 156, and uplink antenna 158. The NCC 150 receives the data from the base stations via the communication module 152 and processes the data according to specific algorithms with help of data processing unit 154 to generate a consolidated set of correction data (described in more detail below). The NCC 150 transmits the consolidated set of correction data to the geosynchronous (geostationary) relay satellite 160 via the satellite uplink channel 151 with help of the satellite transmitter 156, and the uplink antenna 158.

The geosynchronous relay satellite 160 then retransmits the consolidated set of correction data over a specific region (zone) of the Earth. Multiple geosynchronous relay satellites provide coverage for multiple zones. In FIG. 1C, the rover 170 receives the consolidated set of error correction data from the geosynchronous relay satellite 160 via the satellite signal 161. The rover 170 then calculates its position from the navigation signals and the consolidated set of correction data. Note that the navigation receiver 172 in the rover 170 needs to be specially equipped and programmed to process the satellite signal 161.

The consolidated set of correction data can be divided into several groups. The consolidated set of correction data can include:

Corrections to code phase measurements from one or more individual base stations in a group of base stations;

Corrections to both code phase and carrier phase measurements from one or more individual base stations in a group of base stations;

Corrections to orbital (trajectory) parameters and clock parameters of GNSS satellites, specified in the processing of measurements from a group of base stations;

Corrections to code phase measurements for a some virtual (i.e., non-existent) base station generated from processing GNSS measurements for a group of base stations;

Corrections to code phase and carrier phase measurements for a virtual base station generated from processing GNSS measurements collected with a group of base stations; and Auxiliary information, like ionosphere data, evaluated hardware-induced biases, network ID, textual information on hardware or software of service provider, etc.

A third example of a network DN system, referred to as Precise Point Positioning (PPP), is similar to network RTK in some aspects, but correction data is presented differently. The architecture of the PPP system is identical to that of the SBAS. Referring to FIG. 1C, a PPP system includes a network of base stations 140A-140D distributed regionally or globally. They send their data to the network control center (NCC) 150. The NCC 150 receives the data from the base stations and processes the data according to specific algorithms to generate a consolidated set of error correction data (described in more detail below). As one option, the NCC 150 can transmit the consolidated set of error correction data to the geosynchronous (geostationary) relay satellite 160 via the satellite uplink channel 151. In another option, the NCC 150 can make the consolidated set of error correction data available to a rover via the Internet.

The key distinction between the PPP system and the typical SBAS, despite similarity in infrastructure, is different accuracy. The SBAS can provide position accuracy on the order of a meter or better; whereas, the PPP system is capable of delivering decimeter level position accuracy. In certain cases, PPP correction data sets can make possible carrier phase ambiguity resolution, thus leading to centimeter level position accuracy (similar to RTK).

The consolidated set of error correction data in a PPP system can be partitioned into several groups. The consolidated set of error correction data can include:

Corrections to orbital (trajectory) parameters of GNSS satellites specified in the processing of measurements from a group of base stations;

Corrections to clock parameters of GNSS satellites, specified in the processing of measurements from a group of base stations;

Corrections for residual uncompensated errors of GNSS measurements; and

Auxiliary information, like ionosphere data, evaluated hardware-induced biases, network ID, textual information on hardware or software of service provider, etc.

Each navigation satellite in a global navigation satellite system can transmit navigation signals in one or more frequency bands (for example, in the L1, L2, and L5 frequency bands). To simplify the terminology herein, a navigation receiver is also referred to simply as a receiver. A single-band receiver receives and processes signals in one frequency band (such as L1); a multi-band receiver receives and processes signals in two or more frequency bands (such as L1, L2, and L5). A single-system receiver receives and processes signals from a single GNSS (such as GPS); a multi-system receiver receives and process signals from two or more GNSSs (such as GPS, GLONASS, and GALILEO).

See generally www.rfwireless-world.com/Terminology/GPS-Frequency-Band-and-GNSS-Frequency-Band.html, incorporated by reference herein in its entirety, regarding the GNSS frequency bands.

Figure 2:
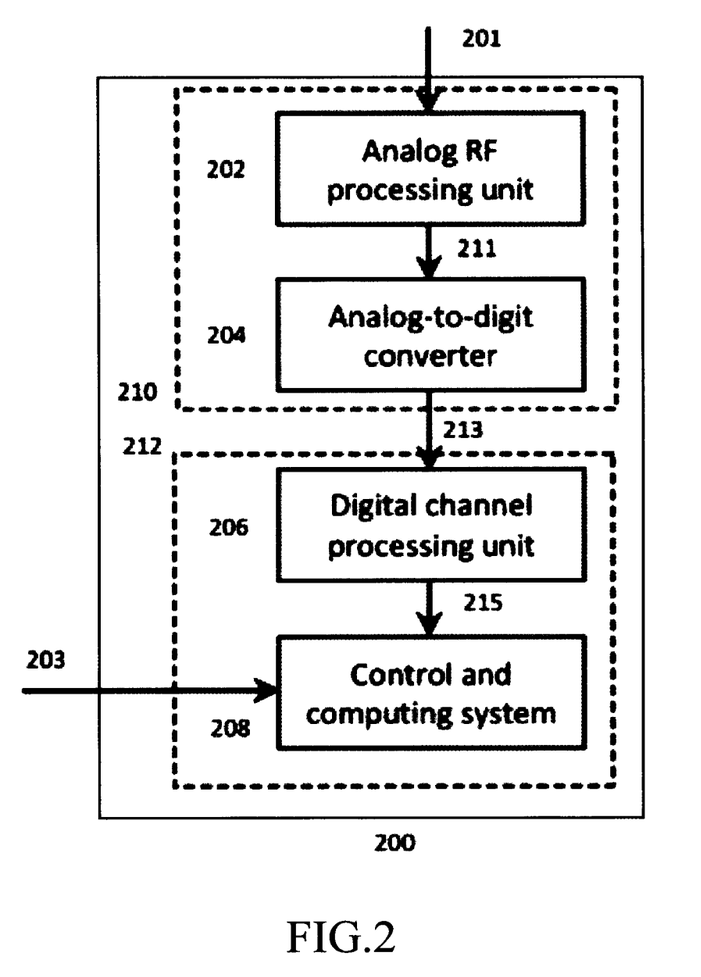
FIG. 2 shows a high-level schematic functional block diagram of an embodiment of a navigation receiver.

FIG. 2 shows a high-level schematic functional block diagram of embodiment of a receiver 200. The input analog signal 201 represents the total signal (also referred to as the combined signal, aggregate signal, or composite signal) of all the navigation signals received by the antenna (not shown) coupled to the receiver 200. For the example shown in FIG. 1A, the input analog signal 201 includes the navigation signals 103A-103F. The input analog signal 201 is first inputted into the analog radio frequency (RF) processing unit 202. In the analog RF processing unit 202, the input analog signal 201 is filtered with a bandpass filter, centered at the frequency of navigation signals (e.g., 1575.42 MHZ), and amplified by a low-noise amplifier, which might have different parameters, for example, a gain of 50 dB, and a noise figure of, for example, 4.0 dB. After that, a signal is mixed with the signal 217 of the local frequency oscillator 216 and passed through a series of filters to transform it into a signal at intermediate frequency of, for example, 47.74 MHz. This transformed signal is denoted as the output analog signal 211.

The output analog signal 211 is input into the analog-to-digit converter (ADC) 204, which digitizes the analog signal 211. The combination of analog RF processing unit (202) and ADC (204) is commonly referred to as radiofrequency (RF) front-end (210).

The output digital signal 213 is then input into the digital channel processing unit 206, which performs signal search, acquisition and tracking in order to generate raw measurement data, based on signal 217 of the frequency oscillator 216. The raw measurement data, besides code phase and carrier phase measurements, includes GNSS information encoded on the navigation signals (such as satellite ephemeris and satellite clock parameters). The output digital signal 215 is input into the control and computing system 208, which computes target parameters such as position, velocity, and time offset.

The combination of digital channel processing unit (206) and control and computing system (208) is commonly referred to as a receiver digital section (212).

If the receiver operates in a differential navigation mode, the control and computing system 208 receives the correction data 203, used to compute target parameters with better accuracy. In the single-base-station DN system shown in FIG. 1A, the error correction data 203 would be received from the communications transceiver 126 in the rover 120. In the network DN system shown in FIG. 1B, the error correction data would be received from the communications transceiver 196 in the rover 190. In the network DN system shown in FIG. 1C, the error correction data 203 would be received from the satellite signal 161.

Figure 3:
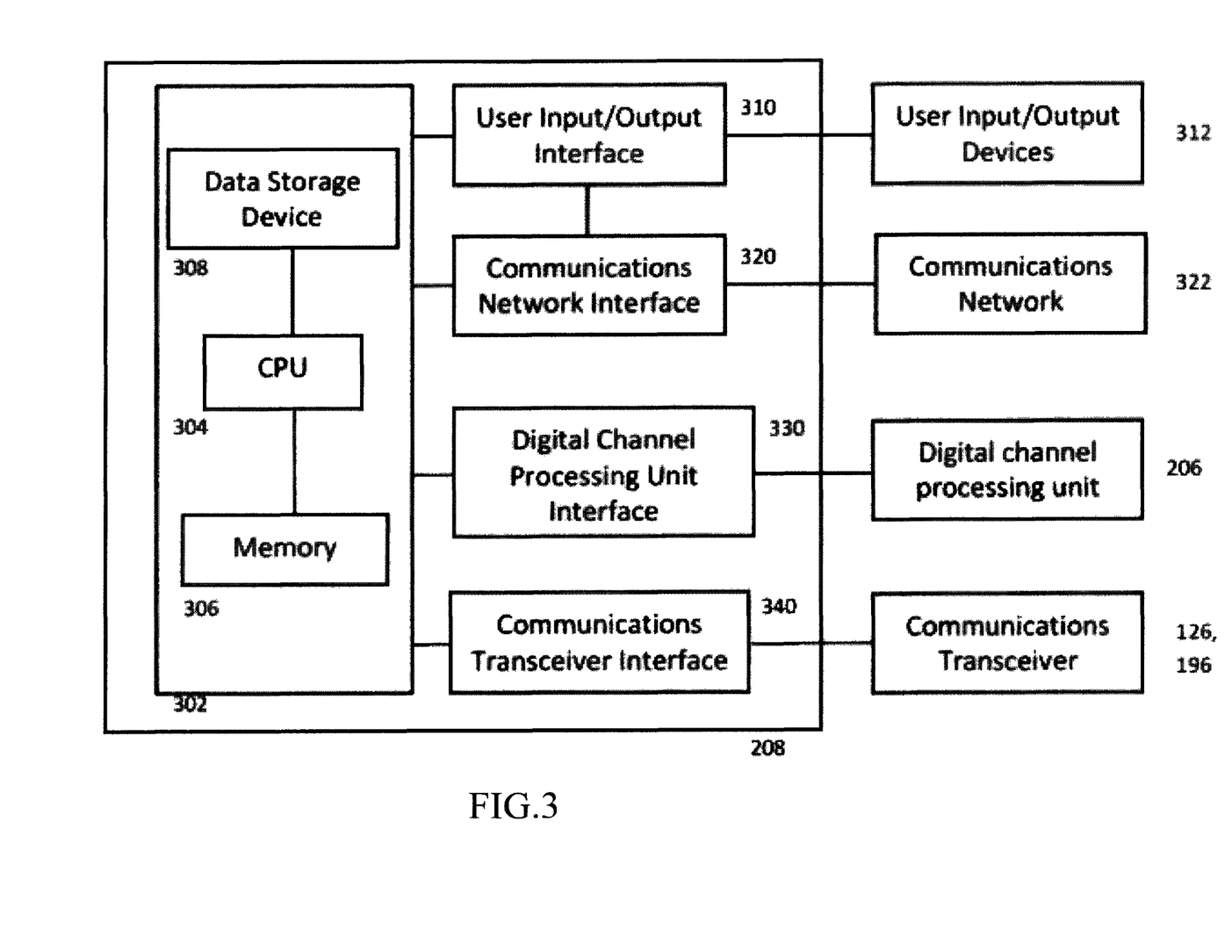
FIG. 3 shows a high-level schematic functional block diagram of a control and computing system implemented within a receiver.

An embodiment of the control and computing system 208 is shown in FIG. 3. One skilled in the art can construct the control and computing system 208 from various combinations of hardware, firmware, and software. One skilled in the art can construct the control and computing system 208 from various electronic components, including one or more general purpose processors (such as microprocessors), one or more digital signal processors, one or more application-specific integrated circuits (ASICs), and one or more field-programmable gate arrays (FPGAs).

The control and computing system 208 includes a computer 302, which includes a processor (referred to as the central processing unit (CPU)) 304, memory 306, and a data storage device 308. The data storage device 308 includes at least one persistent, non-transitory, tangible computer readable medium, such as non-volatile semiconductor memory, a magnetic hard drive, or a compact disc read only memory.

The control and computing system 208 further includes a user input/output interface 310, which interfaces the computer 302 to user input/output devices 312. Examples of user input/output devices 312 include a keyboard, a mouse, a local access terminal, and a video display. Data, including computer executable code, can be transferred to and from the computer 302 via the user input/output interface 310.

The control and computing system 208 further includes a communications network interface 320, which interfaces the computer 302 with a communications network 322. Examples of the communications network 322 include a local area network and a wide area network. A user can access the computer 302 via a remote access terminal (not shown) communicating with the communications network 322. Data, including computer executable code, can be transferred to and from the computer 302 via the communications network interface 320.

The control and computing system 208 further includes a digital channel processing unit interface 330, which interfaces the computer 302 with the digital channel processing unit 206 (see FIG. 2).

The control and computing system 208 further includes a communications transceiver interface 340, which interfaces the computer 302 with a communications transceiver, such as the communications transceiver 126 (see FIG. 1A) or the communications transceiver 196 (see FIG. 1B).

As is well known, a computer operates under control of computer software, which defines the overall operation of the computer and applications. The CPU 304 controls the overall operation of the computer and applications by executing computer program instructions that define the overall operation and applications. The computer program instructions can be stored in the data storage device 308 and loaded into the memory 306 when execution of the program instructions is desired. The algorithms described below can be defined by computer program instructions stored in the memory 306 or in the data storage device 308 (or in a combination of the memory 306 and the data storage device 308) and controlled by the CPU 304 executing the computer program instructions. For example, the computer program instructions can be implemented as computer executable code programmed by one skilled in the art to perform algorithms. Accordingly, by executing the computer program instructions, the CPU 304 executes the algorithms described below.

Figure 4:
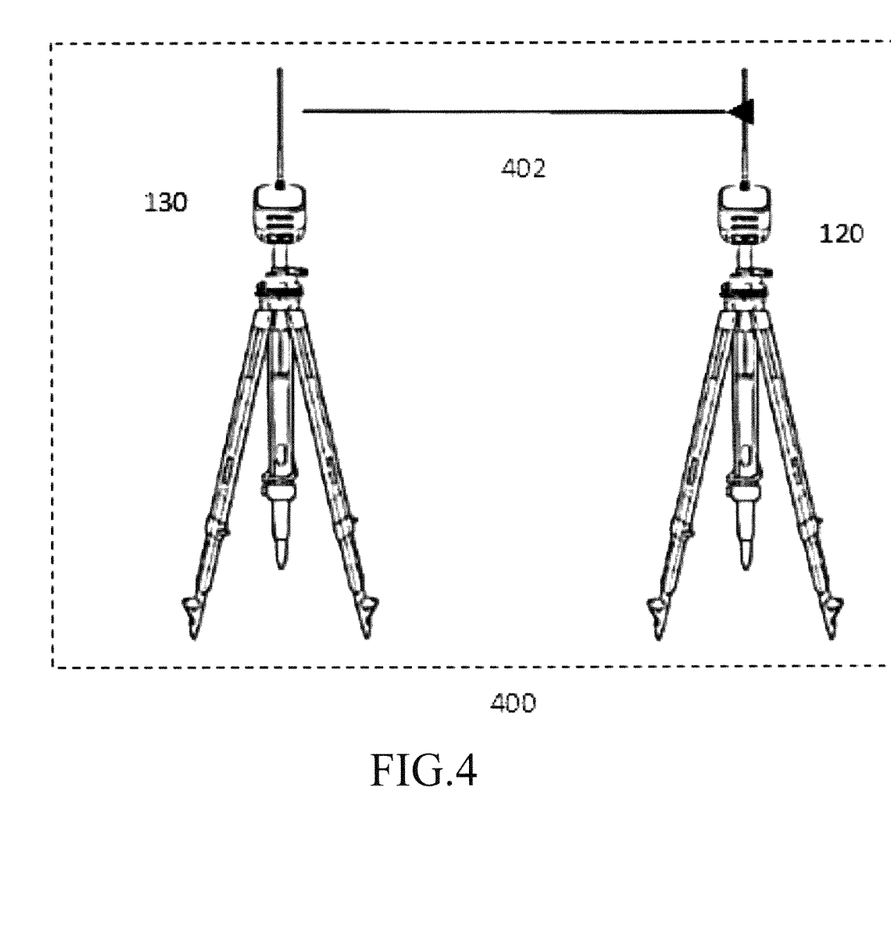
FIG. 4 shows a high-level schematic functional block diagram of an embodiment of apparatus built for the purpose of surveying a position of a static point.

FIG. 4 shows an embodiment of a system 400, where the invention described herein is to be used in a static survey application. The system includes a base receiver 130 installed over a static point, a rover receiver 120 installed over another static point, whose coordinates should be determined with the best possible accuracy, and an interface 402 used to transmit corrections from the base receiver to the rover receiver. One skilled in the art can construct a system 400 of different components in place of items 130, 120 and 402. In one embodiment, the base and the rover receivers might be built as all-in-one boxes on tripods. In another embodiment, they might be built so that GNSS antenna is installed on a tripod being separate from the box containing the GNSS receiver, installed close by. In one embodiment, the interface 402 can be UHF wireless link, in another embodiment the interface 402 can be WIFI, or BLUETOOTH wireless link.

Figure 5:
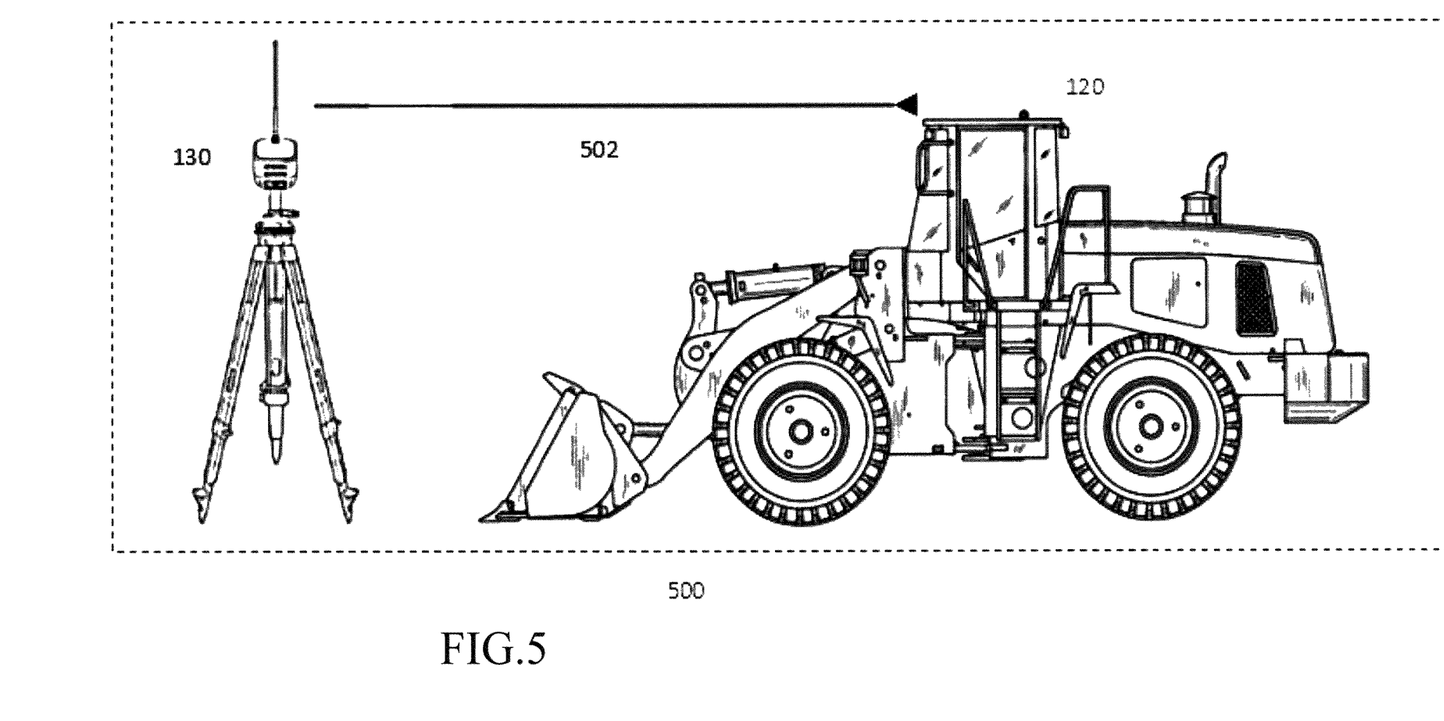
FIG. 5 shows a high-level schematic functional block diagram of an embodiment of apparatus for monitoring a mobile object.

FIG. 5 shows an embodiment of a system 500, where the invention described herein is to be used in application aimed at controlling the mobile rover. The system includes a base receiver 130 installed over a static point, a rover receiver 120 installed on a dynamic vehicle, whose trajectory should be measured and controlled, and an interface 502 used to transmit corrections from base receiver to rover receiver. One skilled in the art can compose a system 500 of different components in place of items 130, 120 and 502, in addition to what is described in relation to FIG. 4. In one embodiment, rover receiver 120 might be installed on a bulldozer, in another embodiment, it might be installed on a scrapper, tractor, or excavator.

Figure 6:
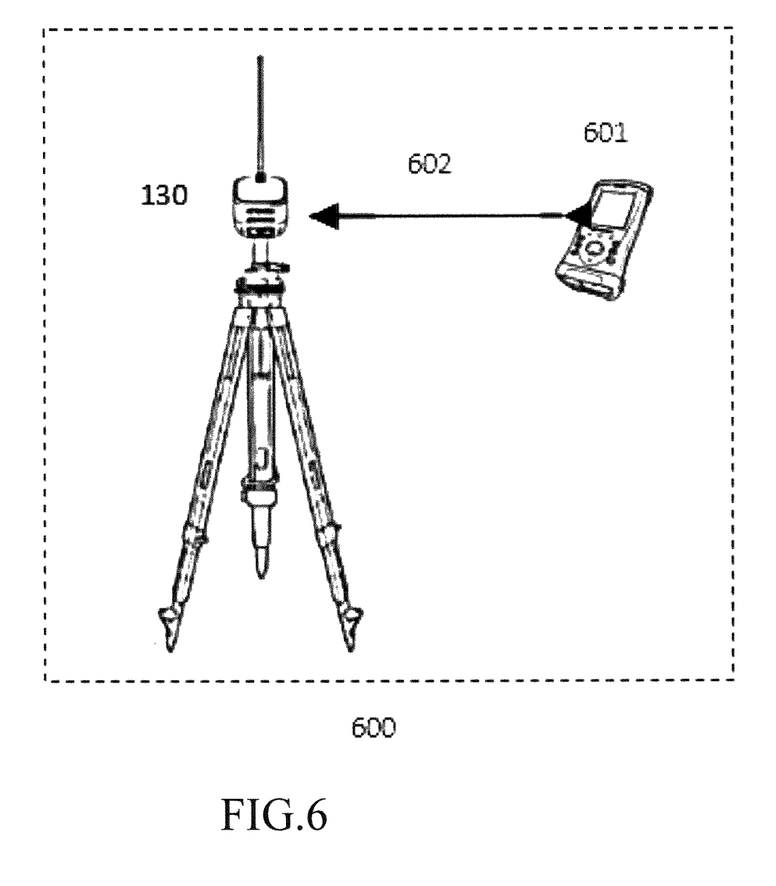
FIG. 6 shows a high-level schematic functional block diagram of an embodiment of apparatus for controlling a static receiver used for monitoring the site displacement or GNSS data static collection.

FIG. 6 shows an embodiment of a system 600, where the invention described herein is to be used for monitoring the data collecting device, involved, for example, in site displacement monitoring process. The system includes a base receiver 130 installed over a static point, a control device 601, and an interface 602 used to exchange data between base receiver and a control device. One skilled in the art can compose a system 600 of different components in place of items 130, 601 and 602. In one embodiment the control device might be built in the form of ruggedized field controller. In another embodiment it might be built in the form of notebook, smartphone, or tablet. Optionally, the control device might run under WINDOWS, ANDROID, IOS, or LINUX.

The following describes the specifics of an approach shown in FIG. 4, or FIG. 5, or FIG. 6. Please refer to the block diagram in FIG. 7.

Figure 7:
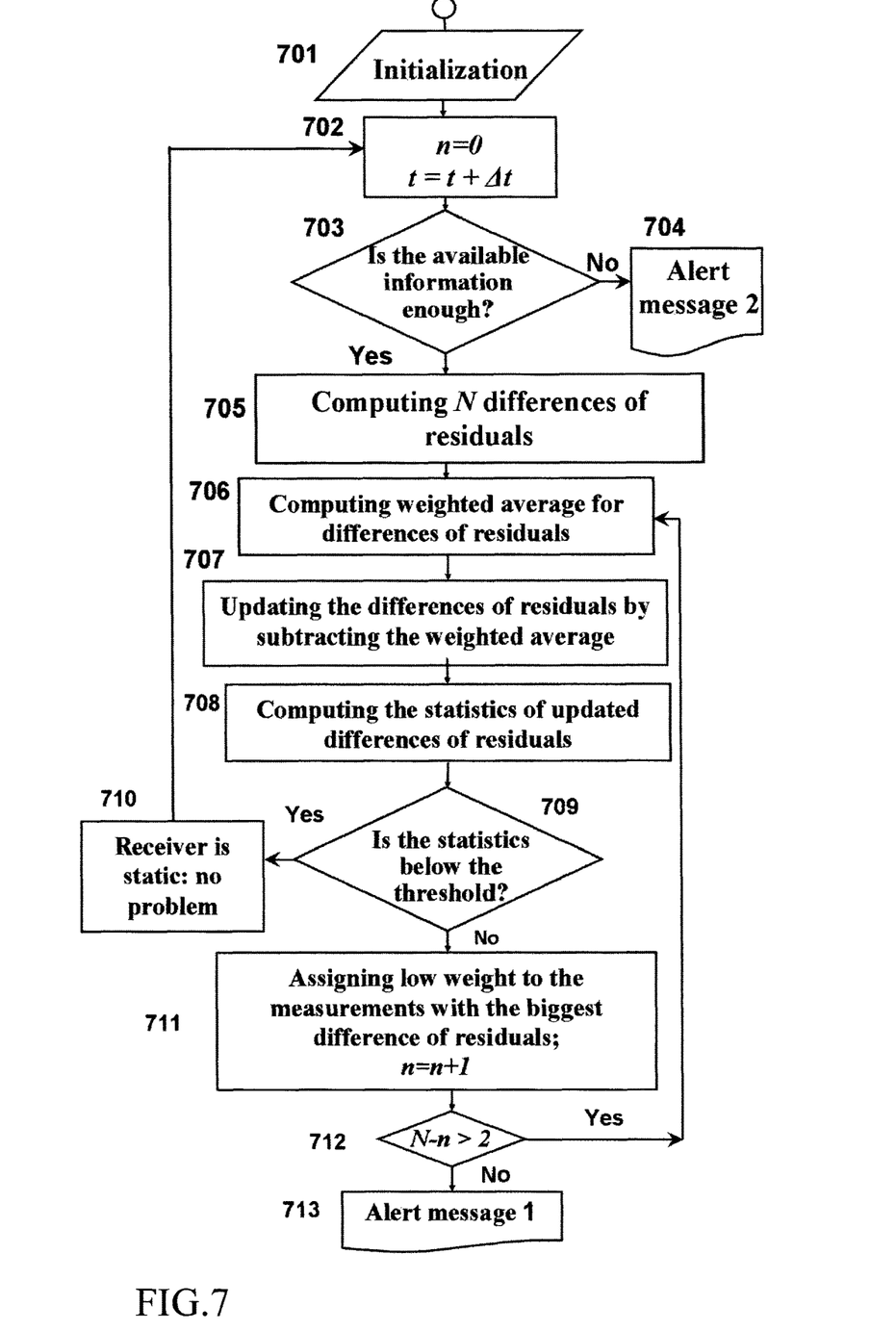
FIG. 7 shows an algorithm for detecting a fact of motion of a receiver using GNSS measurement data.

Let us assume that a GNSS receiver algorithm, after initializing at step 701, obtains carrier phase measurements with a certain period, say, every second, or 10 times per second at step 702.

At step 703 the measurement and digital data are checked for consistency and redundancy, and a decision is made if the available data are enough for reliable motion detection.

If available data are not enough, and reliable motion detection is impossible, the alert message 2 is output at step 704.

Generally, recommendations for a customer on what to do upon receiving an alert message 2 depend on the specific use case. He might want to wait until the system comes to a state when motion detection is possible, or he might get back to his system to check it for integrity, or malfunctions.

If motion detection is possible, a difference of carrier phase residuals is computed at step 705, which is called residual's single difference hereinafter:

$$W_t^j = \varphi_t^j - \varphi_{t-\Delta t}^j - R_t^j + R_{t-\Delta t}^j \quad (1)$$

where
j—satellite number (j=1; N);
$\Delta t$—time interval between measurements;
$\varphi_t^j$—carrier phase for j-th satellite, measured at time t;
$\varphi_{t-\Delta t}^j$—carrier phase for j-th satellite, measured at time, different from t by $\Delta t$;
$R_t^j$— geometric distance to j-th satellite, computed for time t;
$R_{t-\Delta t}^j$—geometric distance to j-th satellite, computed for time different from by $\Delta t$.

For computing geometric distances certain manipulations should be done. The list of manipulations is typical and is described in relevant GNSS Interface Control Documents. For example, for GPS, this is "ICD-GPS-200C, Interface Control Document, 10 Oct. 1993". This list can include extrapolation of GNSS satellite ephemeris and clock parameters to the needed time instants, introducing corrections for Earth rotation and relativistic effects, accounting for delays due to signal propagation through ionosphere and troposphere.

The weighted average is computed at step 706, which is the evaluation of clock impact increment and other biases during the $\Delta t$ interval:

$$T_t = \frac{\sum_{j=1}^{N_t} (W_t^j \times P_t^j)}{\sum_{j=1}^{N_t} (P_t^j)}; \quad (2)$$

where $P_t^j$—weight for $W_t^j$.

The weight can be assigned in a variety of ways, for example:

$$P_t^j = \frac{1}{\sigma^2 \times \sin z_t^j}; \quad (3)$$

where z—the satellite zenith angle

σ—evaluation of carrier phase increment measurement error, chosen based on some empirical assumptions, for example, σ=0.01 m. In alternative implementation the weights might be set to unity for simplicity.

The residual's single differences are updated at step 707:

$$V_t^j = W_t^j - T_t; j = [1; N_t] \quad (4)$$

The statistics of residual's single difference is computed at step 708, which is the normalized sum of residual's single differences weighted squares:

$$S_t = \frac{\sum_{j=1}^{N_t} (V_t^j \times V_t^j \times P_t^j)}{N_t - 1}; \quad (5)$$

The next step should be comparing the statistic with a threshold.

One skilled in the art might compute the statistics differently. For example, the following equation can be used:

$$S_t = \sum_{j=1}^{N_t} (V_t^j \times V_t^j \times P_t^j); \quad (6)$$

In case of (6) the value of $S_t$ should follow chi-square distribution law under assumption of Gaussian distribution for $V_t^j$ values. If so, the threshold for $S_t$ in (6) is assigned based on chi-square distribution values. However, in reality the values of $V_t^j$ are far from being Gaussian, and formula (5) works better, provided threshold selection is based on empirical data.

As such, for (5) a relationship is checked at step 709:

$$S_t \leq K1; \quad (7)$$

where

K1—a dimensionless threshold chosen empirically, for example, $K1=3^2=9$

If (7) holds true, this means two facts: a) there are no anomalous errors in measurements, and b) the receiver is static. If so, a decision is made at step 710 that no problem exists, and data of the next measurement epoch is involved at step 702.

If (7) is not true, this might mean either or both of two facts: a) there are anomalous errors in measurements, and b) the receiver has been moved. As such, the first action to undertake is to check, if there are anomalous errors.

To check this, the one skilled in the art can use the rigorous approach, such that, at first, measurements are excluded one-be-one, and the relationship (7) is checked for N−1 residual's single differences in all possible combinations, via repeating (2) through (7). If no set of N−1 residual's single differences is found which satisfies (7), the relationship (7) is checked for N−2 residual's single differences in all possible combinations, via repeating (2) through (7). If no set of N−2 residual's single differences is found which satisfies (7), the relationship (7) is checked for N−3 residual's single differences in all possible combinations, via repeating (2) through (7) and the process continues, until N−n equals 2, or (7) is satisfied, where n—the number of measurements, excluded at each step of checking. A threshold of 2 for N−n is determined with non-zero number of degrees of freedom, while computing (2).

The rigorous approach is time consuming and expectedly needs a lot of processor power. Below is the simplified approach described, which is a compromise between sensitivity to multiple anomalies and processor power needed.

As such, if (7) is not satisfied, the maximal residual among $V_t^j$ is searched at step 709. When found, two alternative ways of acting are equally efficient: first, excluding this measurement, and repeating (2), (4), (5), (7) for N−1 residual's single differences, or second, assigning extremely low weight to the maximal residual's single difference, and repeating (2), (4), (5), (7) for N residual's single differences. The extremely low weight might be formed, for instance, if to assign very big value to σ in (3), for example $\sigma=10^{16}$ m. Assigning low weight just isolates a certain measurement, leaving it in processing, thus allowing to avoid resorting arrays.

Then, (2), (4), (5), (7) should be repeated until the N−n=2, or (7) is satisfied, where n—the number of measurements, excluded, or isolated due to assigning extremely low weight at each step of checking.

If it was found at step 712, that N−n is larger than 2, this means that the search for anomalies might be continued, returning to step 706. If not, this is the reason for issuing an alert message 1 to a customer at step 713, as this could mean that either the receiver has been moved during the $\Delta t$ interval, or all measurements contain anomalies, which is improbable for a static receiver working under open sky. As such, there is an urgent need for a customer to visit a receiver and check it for integrity or malfunctions.

The methodology described above might have some variations. For example, instead of checking N−n against 2, N−n might be checked against other bigger constant, for example 3, or 4. Or n itself might be limited with just 2, or 3, or 4. This would mean stopping the search before all measurements are checked in the assumption that if a bigger part of measurements is affected, there is no need to go through with the algorithm until the very end, as the probability is high that all the measurements are affected, meaning alert conditions.

In case when the search for anomalies has been stopped earlier, it makes sense to perform an extra check with the same data to have more trust in the decision made. The goal of the extra check is to directly evaluate the position change of the receiver during the $\Delta t$ interval.

One skilled in the art can achieve this goal in a variety of ways. For example, Kalman filter, or Least Squares Method (LSM) can be used. Below is the example of using LSM is given for the simplified case of data coming from a single GNSS (for example, GPS) (referring to the FIG. 8).

Figure 8:
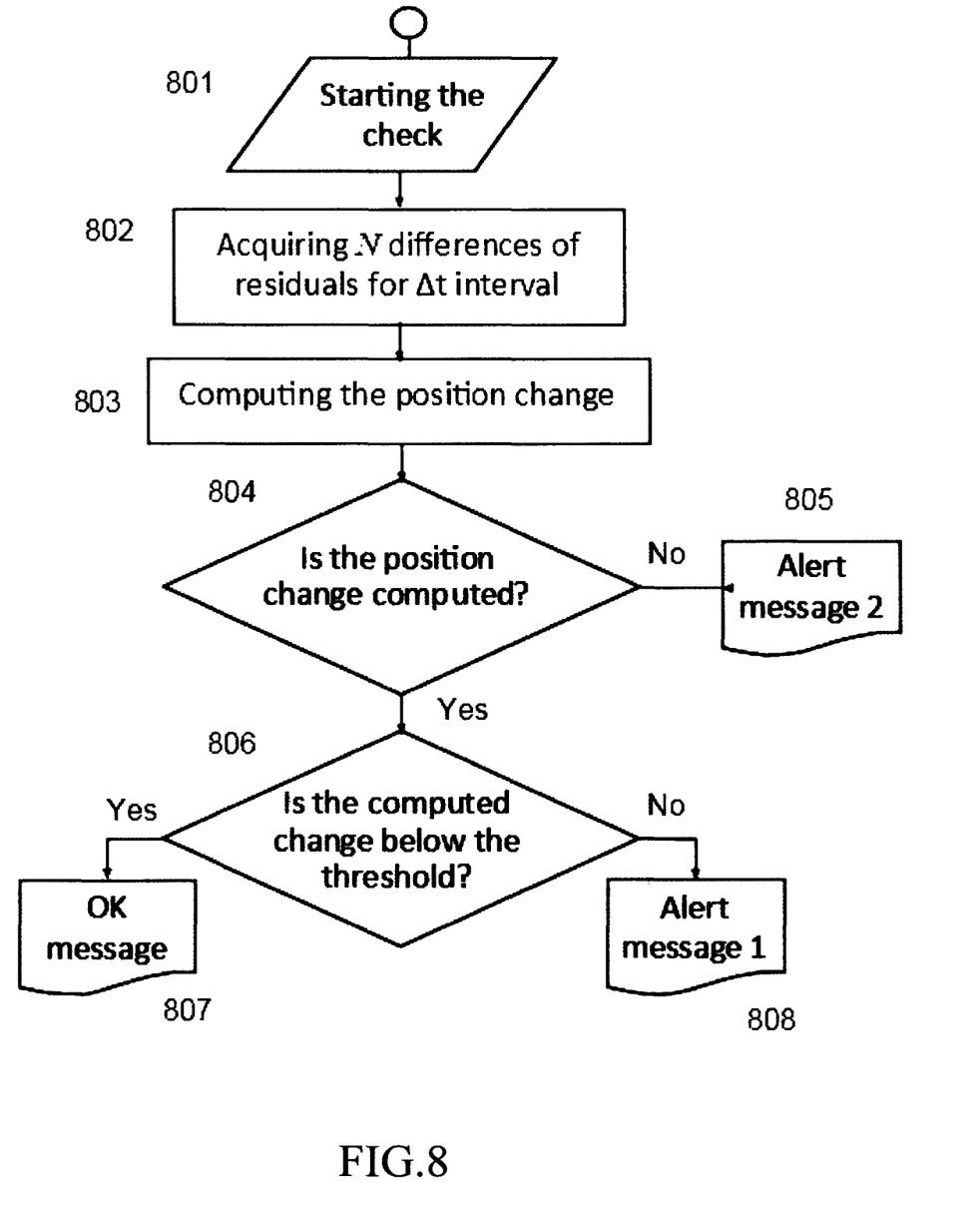
FIG. 8 shows a block diagram of an algorithm for determining a change in coordinates of a GNSS antenna, that occurred during a certain time interval.

The check is started at step 801, and the differences of residuals are acquired at step 802. At step 803, the position change is computed. According to LSM approach, the position change in a matrix form is determined as follows:

$$\Delta \vec{X}_t = (H^T R_t H)^{-1} H^T R_t \Delta \vec{Y}_t \qquad (8)$$

where $$\Delta \vec{X}_t = \begin{vmatrix} \Delta x_t \\ \Delta y_t \\ \Delta z_t \\ \Delta d_t \end{vmatrix} - \text{vector of positional and clock impact increments between } t$$

and t—$\Delta t$ epochs and increment;

$$\Delta \vec{Y}_t = \begin{vmatrix} W_t^1 \\ W_t^2 \\ \dots \\ W_t^N \end{vmatrix} - \text{vector of residuals, computed in accordance with;} \qquad (1)$$

$R_t$—a weight matrix of N×N size, whose diagonal is composed of $P_t^j$, computed in accordance with (3), with non-diagonal elements equal to zeros;

$$H = \begin{vmatrix} \frac{\partial \Delta x_t}{\partial \Delta \varphi_t^1} & \frac{\partial \Delta y_t}{\partial \Delta \varphi_t^1} & \frac{\partial \Delta z_t}{\partial \Delta \varphi_t^1} & 1 \\ \frac{\partial \Delta x_t}{\partial \Delta \varphi_t^2} & \frac{\partial \Delta y_t}{\partial \Delta \varphi_t^2} & \frac{\partial \Delta z_t}{\partial \Delta \varphi_t^2} & 1 \\ \dots & \dots & \dots & \dots \\ \frac{\partial \Delta x_t}{\partial \Delta \varphi_t^N} & \frac{\partial \Delta y_t}{\partial \Delta \varphi_t^N} & \frac{\partial \Delta z_t}{\partial \Delta \varphi_t^N} & 1 \end{vmatrix} -$$

design matrix, consisting of partial derivatives $$\Delta \varphi_t^j = \varphi_t^j - \varphi_{t-\Delta t}^j$$

At step 804, a condition should be checked if the position change is computed. The reason for not computing might be the problems for example, with matrix inversion, or too many measurements rejected by the internal algorithm's logic.

If the position change is not computed, an alert message 2 should be output at 805, which means impossibility to reliably detect the fact of motion, When $\Delta \vec{X}_t$ is computed, the position change $\Delta l_t$ might be determined as:

$$\Delta l_t = \sqrt{\Delta x_t^2 + \Delta y_t^2 + \Delta z_t^2} \qquad (9)$$

At step 806, the position change $\Delta l_t$ should be checked against certain threshold:

$$\Delta l_t \leq K2; \qquad (10)$$

where

K2—a threshold chosen empirically, for example, K2=0.03 m, assuming that the noise of carrier phase measurements is within 0.01 m.

One skilled in the art may use rigorous determination of the K2-threshold, based on covariance analysis, where the covariance of position change $(Q_t)$ computed, as a by-product of (8):

$$Q_t = (H^T R_t H)^{-1} \qquad (11)$$

The diagonal elements of $Q_t$-matrix represent error dispersions of the respective components of $\Delta \vec{X}_t$-vector. As such, the threshold for position change might be computed as follows (based on 3-sigma rule, for example):

$$K2 = 3 \times \sqrt{q_t(0,0) + q_t(1,1) + q_t(2,2)} \qquad (12)$$

where $q_t(0,0)$, $q_t(1,1)$, $q_t(2,2)$—the 1-st, the 2-nd, the 3-rd diagonal elements of $Q_t$-matrix, corresponding to $\Delta x_t$, $\Delta y_t$, $\Delta z_t$ components of $\Delta \vec{X}_t$-vector.

If (10) is satisfied, then no problem exists, and "OK" message is output at 807. If the opposite is true, then the alert message 1 is output at 806. Output of alert message 1 means that either the receiver has been moved during the $\Delta t$ interval, or all measurements contain anomalies, which is improbable. As such, there is a need for a customer to visit a receiver and check it for integrity, or malfunctions.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. A method for detecting the motion of a physical object using global navigation satellite system (GNSS) signals, the method comprising:
   (i) evaluating distances between a GNSS antenna and GNSS satellites using carrier phase measurements at a first time;
   (ii) computing distances between known position of the GNSS antenna and known positions of the GNSS satellites at the first time;
   (iii) for each GNSS satellite in (i) and (ii), calculating a first set of residuals as the distances in (i) minus the distances in (ii);
   (iv) evaluating distances between the GNSS antenna and the GNSS satellites using carrier phase measurements at a second time, which is later than the first time;

(v) computing distances between known position of the GNSS antenna and known positions of the GNSS satellites at the second time;
(vi) for each GNSS satellite in (iv) and (v), calculating a second set of residuals as the distances in (iv) minus the distances in (v);
(vii) computing a set of differences between the first set of residuals and the second set of residuals;
(viii) computing a metric based on the set of differences in (vii);
(ix) comparing the metric to a threshold;
(x) based on the comparison in (ix), deciding that either: a) the object has been static, b) the object has been moved between the first time and the second time, c) there is insufficient information to reliably detect whether or not the object has been moved;
(xi) issuing an alert message in case of (b) or (c) in (x).

2. The method of claim 1, wherein (viii) includes adjusting the set of differences to account for cumulative effect of clock bias and other biases common for all residuals.

3. The method of claim 1, wherein the metric in (viii) is generated by any of: summing residuals' absolute values, residuals' squared values, residuals' weighted values, normalizing a sum by a number of degrees of freedom, and making a square root of the sum of squared values.

4. The method of claim 1, wherein the threshold in (ix) is chosen based on any of: empirical assumptions, knowledge of carrier phase measurement errors, degrees of freedom, and chi-square distribution.

5. An apparatus for detecting the motion of physical objects with help of global navigation satellite system (GNSS) signals, the apparatus comprising:
antenna for receiving the GNSS signals (GNSS antenna) installed on the physical object;
a receiver GNSS receiver connected to the GNSS antenna;
wherein the GNSS receiver is configured to:
(i) evaluate distances between a GNSS antenna and GNSS satellites using carrier phase measurements at a first time;
(ii) compute distances between known position of the GNSS antenna and known positions of the GNSS satellites at the first time;
(iii) for each GNSS satellite in (i) and (ii), calculate a first set of residuals as the distances in (i) minus the distances in (ii);
(iv) evaluate distances between the GNSS antenna and the GNSS satellites using carrier phase measurements at a second time, which is later than the first time;
(v) compute distances between known position of the GNSS antenna and known positions of the GNSS satellites at the second time;
(vi) for each GNSS satellite in (iv) and (v), calculate a second set of residuals as the distances in (iv) minus the distances in (v);
(vii) compute a set of differences between the first set of residuals and the second set of residuals;
(viii) compute a metric based on the set of differences in (vii);
(ix) compare the metric to a threshold;
(x) based on the comparison in (ix), decide that either: a) the object has been static, b) the object has been moved between the first time and the second time, c) there is insufficient information to reliably detect whether or not the object has been moved;
(xi) issue an alert message in case of (b) or (c) in (x).

6. The apparatus of claim 5, wherein (viii) includes adjusting the set of differences to account for cumulative effect of clock bias and other biases common for all residuals.

7. The apparatus of claim 5, wherein the metric in (viii) is generated by any of: summing residuals' absolute values, residuals' squared values, residuals' weighted values, normalizing a sum by a number of degrees of freedom, and making a square root of the sum of squared values.

8. The apparatus of claim 5, wherein the threshold in (ix) is chosen based on any of: empirical assumptions, knowledge of carrier phase measurement errors, degrees of freedom, and chi-square distribution.

9. The apparatus of claim 5, wherein, when issuing the alert message, the GNSS receiver stops generating differential corrections.

10. The apparatus of claim 5, wherein, when issuing the alert message, the GNSS receiver stops output of raw GNSS measurement data.

11. The apparatus of claim 5, wherein the alert message includes reference time, alert status, receiver coordinates, and GNSS receiver coordinates' error evaluations.

12. The apparatus of claim 5, wherein the alert message is either of d) object has been moved; e) object movement status is undetermined.

* * * * *